United States Patent
Byrne et al.

(10) Patent No.: US 6,539,382 B1
(45) Date of Patent: Mar. 25, 2003

(54) INTELLIGENT PRE-CACHING ALGORITHM FOR A DIRECTORY SERVER BASED ON USER DATA ACCESS HISTORY

(75) Inventors: Debora Jean Byrne, Austin, TX (US); Dah-Haur Lin, Austin, TX (US); Shaw-Ben Shepherd Shi, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/303,109

(22) Filed: Apr. 29, 1999

(51) Int. Cl.⁷ .............................. G06F 17/30
(52) U.S. Cl. ................... 707/10; 707/3; 707/4; 709/223; 709/218
(58) Field of Search .................. 707/1–4, 100, 707/8, 10; 709/203, 226, 315

(56) References Cited

U.S. PATENT DOCUMENTS

| | | | | |
|---|---|---|---|---|
| 5,664,173 A | * | 9/1997 | Fast | 707/4 |
| 5,907,837 A | * | 5/1999 | Ferrel et al. | 707/3 |
| 5,943,687 A | * | 8/1999 | Leidberg | 711/156 |
| 5,995,961 A | * | 11/1999 | Levy et al. | 707/4 |
| 6,014,711 A | * | 1/2000 | Brown | 709/245 |
| 6,052,681 A | * | 4/2000 | Harvey | 707/3 |
| 6,067,565 A | * | 5/2000 | Horvitz | 709/218 |
| 6,085,188 A | * | 7/2000 | Bachmann et al. | 707/3 |
| 6,154,776 A | * | 11/2000 | Martin | 709/226 |
| 6,157,942 A | * | 12/2000 | Chu et al. | 709/203 |
| 6,169,989 B1 | * | 1/2001 | Eichstaedt et al. | 707/100 |
| 6,347,312 B1 | * | 2/2002 | Byrne et al. | 707/3 |

* cited by examiner

Primary Examiner—Hosain T. Alam
Assistant Examiner—Anh Ly
(74) Attorney, Agent, or Firm—Jeffrey S. LaBaw; Joseph R. Burwell; David H. Judson

(57) ABSTRACT

A caching mechanism for a directory service having a backing store. According to the invention, directory search results are cached over a given data capture period, with the information then being used by a data analysis routine to generate a data access history for the user for a particular application. That history is then used to generate a recommended pre-fetch time, a filter key for the pre-fetch, and a preferred cache replacement policy (e.g., static or LRU). Based on that information, a control routine pre-fetches and populates the cache with information that is expected to be needed by the user as a result of that access history.

25 Claims, 3 Drawing Sheets

INTELLIGENT PRE-CACHING ALGORITHM FOR A DIRECTORY SERVER BASED ON USER DATA ACCESS HISTORY

BACKGROUND OF THE INVENTION

1. Technical Field

This invention relates generally to providing directory services in a distributed computing environment.

2. Description of the Related Art

A directory service is the central point where network services, security services and applications can form a integrated distributed computing environment. The current use of a directory services may be classified into several categories. A "naming service" (e.g., DNS and DCE Cell Directory Service (CDS)) uses the directory as a source to locate an Internet host address or the location of a given server. A "user registry" (e.g., Novell NDS) stores information of all users in a system composed of a number of interconnected machine. The central repository of user information enables a system administrator to administer the distributed system as a single system image. Still another directory service is a "yellow pages" lookup provided by some e-mail clients e.g., Netscape Communicator, Lotus Notes, Endora and the like.

With more applications and system services demanding a central information repository, the next generation directory service will need to provide system administrators with a data repository that can significantly ease administrative burdens. In addition, the future directory service must also provide end users with a rich information data warehouse that allows them to access department or company employee data, as well as resource information, such as name and location of printers, copy machines, and other environment resources. In the Internet/intranet environment, it will be required to provide user access to such information in a secure manner.

To this end, the Lightweight Directory Access Protocol (LDAP) has emerged as an IETF open standard to provide directory services to applications ranging from e-mail systems to distributed system management tools. LDAP is an evolving protocol that is based on a client-server model in which a client makes a TCP/IP connection to an LDAP server, sends requests, and receives responses. The LDAP information model in particular is based on an "entry," which contains information about some object. Entries are typically organized in a specified tree structure, and each entry is composed of attributes.

LDAP provides a number of known functions including query (search and compare), update, authentication and others. The search and compare operations are used to retrieve information from the database. For the search function, the criteria of the search is specified in a search filter. The search filter typically is a Boolean expression that consists of attribute name, attribute value and Boolean operations like AND, OR and NOT. Users can use the filter to perform complex search operations. The filter syntax is defined in RFC 1960.

LDAP thus provides the capability for directory information to be efficiently queried or updated. It offers a rich set of searching capabilities with which users can put together complex queries to get desired information from a backing store. Increasingly, it has become desirable to use a relational database for storing LDAP directory data. Representative database implementations include DB/2, Oracle, Sybase, Informix and the like. As is well known, Structured Query Language (SQL) is the standard language used to access such databases.

One of main goals for implementing an LDAP directory service with an relational database backing store is to provide a design and implementation such that all LDAP search queries can be executed efficiently. In the case of repetitive searches involving the same search query, however, it is not cost-effective to return to the backing store repetitively due to the nature of the database management system. In particular, it is very time consuming and expensive to go through the DBMS layers necessary to access entries inside the database for every entry required to be returned.

One approach to solving this problem is to use caching. As is well known, caching is a commonly used mechanism to improve performance. Instead of going to the server to obtain the requested data, a copy of that data stored in local memory is used to satisfy the data access request. However, most of the caching algorithms known today focus on how to maintain the cache after the data is retrieved from the server. Therefore, a user only sees a performance benefit after the data is initially accessed. In other words, the cache is primarily useful for applications that make the same query many times. There are a large number of applications that only make queries once or infrequently. Such queries, however, are made on a regular basis. A representative application is single sign-on (SSO), which enables an authorized user to perform one initial sign-on to access a variety of networks, systems and applications. These applications may actually take a performance hit due to the effort required to update and maintain a cache that never gets used because the same query is rarely repeated. In addition, information in the cache is lost when the directory server is rebooted. Therefore, known caching mechanisms do not address all of the requirements for applications of this type.

BRIEF SUMMARY OF THE INVENTION

It is an object of this invention to provide a novel caching mechanism, preferably for use by applications that exhibit a pattern within their queries so that these applications recognize a performance benefit the first time data is accessed during a given time period.

Another primary object of the present invention is to populate a cache before a user makes a query into a directory server having a backing store. In this case, the user obtains a fast response, even if he or she tries to access the data for the first time.

It is yet another object of the present invention to pre-fetch given data and populate a cache with such data based upon a user's data access history. This access history is also preferably used to implement a cache replacement policy.

Yet another more general object of the present invention is to provide a pre-caching mechanism for applications that typically access data sources periodically and on a daily basis.

It is a more general object of this invention to obviate repetitive inquiries into a relational database backing store used by a hierarchical-based directory service.

It is yet another object to search a relational database using hierarchical, filter-based queries, such as LDAP, and efficiently caching search results to increase search efficiency for repetitive queries.

Another object of this invention is to cache search results in a more efficient manner in a directory service having a relational database backing store.

Still another important object is to provide a mechanism for populating a local storage area associated with an LDAP directory service with directory search results retrieved from a relational database.

Yet another general object of this invention is to enhance the efficiency of a directory service using a caching mechanism.

The present invention is preferably implemented in a directory server having a backing store. According to the invention, a method for populating a cache for an application begins by profiling the application for repetitive user query patterns that reoccur during specific time periods on a periodic (e.g., daily, weekly, etc.) basis. Based on the repetitive user query patterns, the method identifies given information that is likely to satisfy a query expected to be generated at a given time. Prior to the given time, the cache is populated with the given information. Thus, if the user makes the query as expected, the given information will be present in the cache and will not have to be fetched from the backing store.

The foregoing has outlined some of the more pertinent objects and features of the present invention. These objects and features should be construed to be merely illustrative of some of the more prominent features and applications of the invention. Many other beneficial results can be attained by applying the disclosed invention in a different manner or modifying the invention as will be described. Accordingly, other objects and a fuller understanding of the invention may be had by referring to the following Detailed Description of the preferred embodiment.

BRIEF DESCRIPTION OF THE DRAWINGS

For a more complete understanding of the present invention and the advantages thereof, reference should be made to the following Detailed Description taken in connection with the accompanying drawings in which.

DETAILED DESCRIPTION OF THE PREFERRED EMBODIMENT

Figure 1:
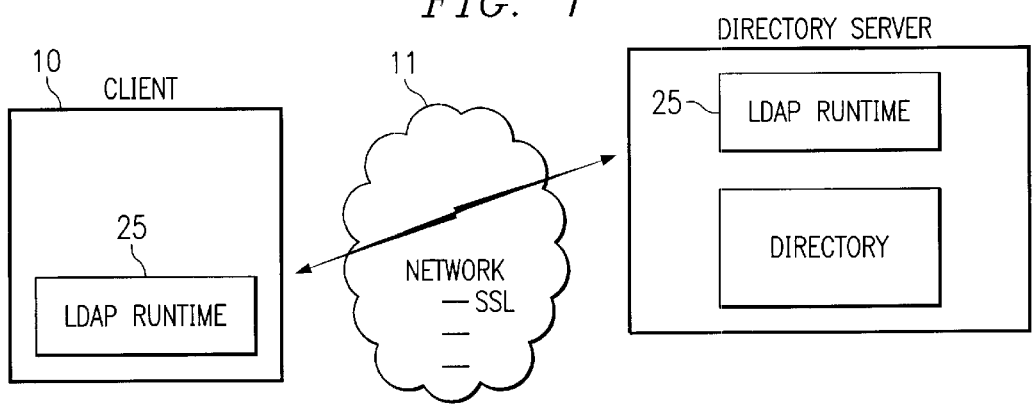
FIG. 1 is a representative LDAP directory service implementation.
Figure 2:
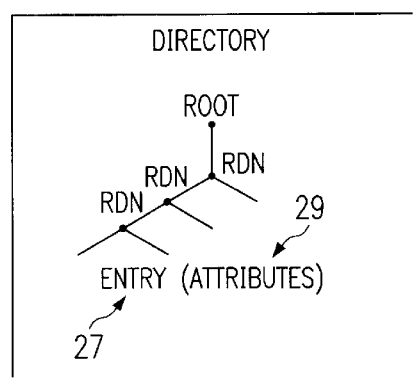
FIG. 2 is a simplified LDAP directory.

A block diagram of a representative LDAP directory service in which the present invention may be implemented is shown in FIG. 1. As is well-known, LDAP is the lightweight directory access protocol, and this protocol has been implemented in the prior art, e.g., as either a front end to the X.500 directory service, or as a standalone directory service. According to the protocol, a client machine 10 makes a TCP/IP connection to an LDAP server 12, sends requests and receives responses. LDAP server 12 supports a directory 21 as illustrated in a simplified form in FIG. 2. Each of the client and server machines further include a directory runtime component 25 for implementing the directory service operations as will be described below. The directory 21 is based on the concept of an "entry" 27, which contains information about some object (e.g., a person). Entries are composed of attributes 29, which have a type and one or more values. Each attribute 29 has a particular syntax that determines what kinds of values are allowed in the attribute (e.g., ASCII characters, .jpeg file, etc.) and how these values are constrained during a particular directory operation.

The directory tree is organized in a predetermined manner, with each entry uniquely named relative to its sibling entries by a "relative distinguished name" (RDN). An RDN comprises at least one distinguished attribute value from the entry and, at most, one value from each attribute is used in the RDN. According to the protocol, a globally unique name for an entry, referred to as a "distinguished name" (DN), comprises a concatenation of the RDN sequence from a given entry to the tree root.

The LDAP search can be applied to a single entry (a base level search), an entry's children (a one level search), or an entire subtree (a subtree search). Thus, the scope supported by LDAP search are: base, one level and subtree. LDAP does not support search for arbitrary tree levels and path enumeration.

Figure 3:
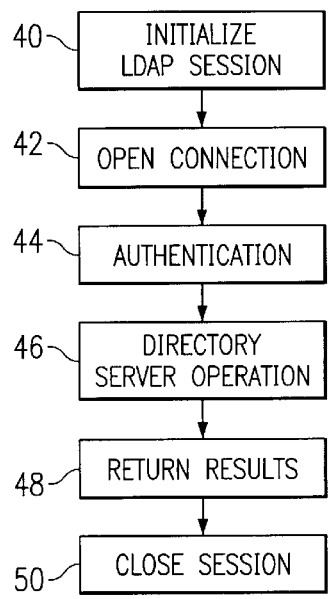
FIG. 3 is a flowchart of an LDAP directory session.

LDAP includes an application programming interface (API), as described in "The C LDAP Application Program Interface", IETF Task Force Working Draft, Jul. 29, 1997, which is incorporated herein by reference. An application on a given client machine uses the LDAP API to effect a directory service "session" according to the flowchart of FIG. 3. At step 40, an LDAP session with a default LDAP server is initialized. At step 42, an API function ldap_init( ) returns a handle to the client, and this handle allows multiple connections to be open at one time. At step 44, the client authenticates to the LDAP server using, for example, an API ldap_bind( ) function. At step 46, one or more LDAP operations are performed. For example, the API function ldap_search( ) may be used to perform a given directory search. At step 48, the LDAP server returns the results. The session is then closed at step 50 with the API ldap_unbind( ) function then being used to close the connection.

Figure 4A:
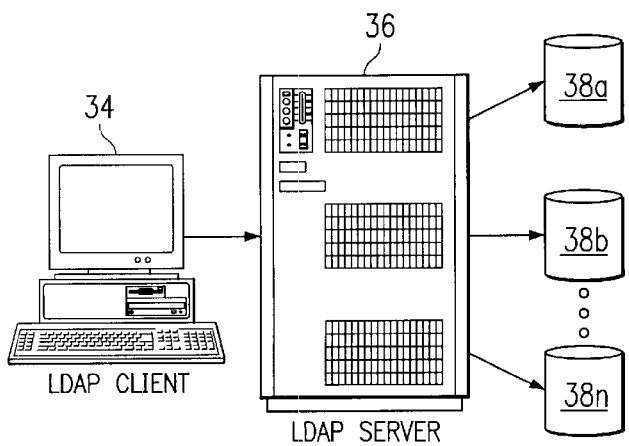
FIGS. 4A–4B show representative LDAP directory service implementations having relational database backing store.
Figure 4B:
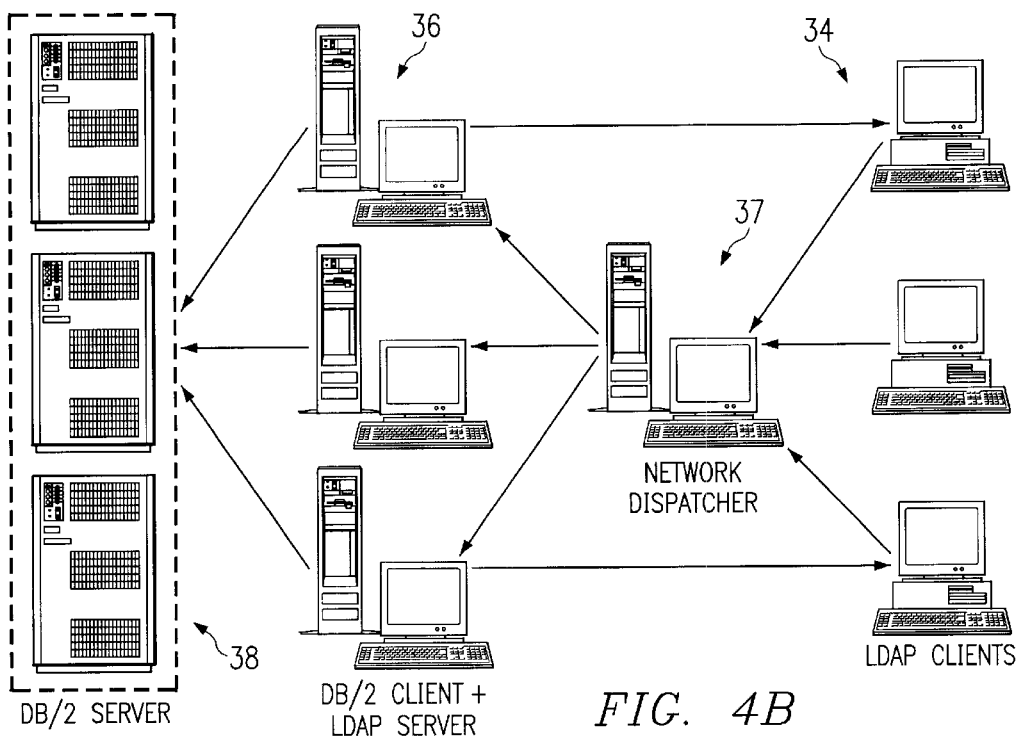

It may be desirable to store LDAP directory data in a backing store. FIGS. 4A–4B illustrate several representative LDAP directory service implementations that use a relational database management system (RDBMS) for this purpose. These systems merely illustrate possible LDAP directory services in which the present invention may be implemented. One of ordinary skill should appreciate, however, that the invention is not limited to an LDAP directory service provided with a DB/2 backing store. The principles of the present invention may be practiced in other types of directory services (e.g., X.500) and using other relational database management systems (e.g., Oracle, Sybase, Informix, and the like) as the backing store.

In FIG. 4A, an LDAP client 34 can connect to a number of networked databases 38a–58n through an LDAP server 36. The databases 38a–38n contain the directory information. However, from the user's perspective, the LDAP server 36 actually stores all the information without knowing the database 38 in which the data is actually located. With this configuration, the LDAP server 36 is freed from managing the physical data storage and is able to retrieve information from multiple database servers 38 which work together to form a huge data storage.

FIG. 4B illustrates a multiple client/multiple server LDAP/DB2 enterprise solution. In this environment, a DB/2 client preferably runs on each LDAP server 36. Each such DB/2 client can connect to any database server 38 containing directory information. The collection of database servers 38a–38n form a single directory system image, and one or more of the LDAP servers 36 can access such information. Because all the LDAP servers 36 see the same directory image, a network dispatcher 37 may be deployed to route requests among the LDAP servers 36.

One of ordinary skill should appreciate that the system architectures illustrated in FIGS. 4A–4B are not to be taken as limiting the present invention.

Figure 5:
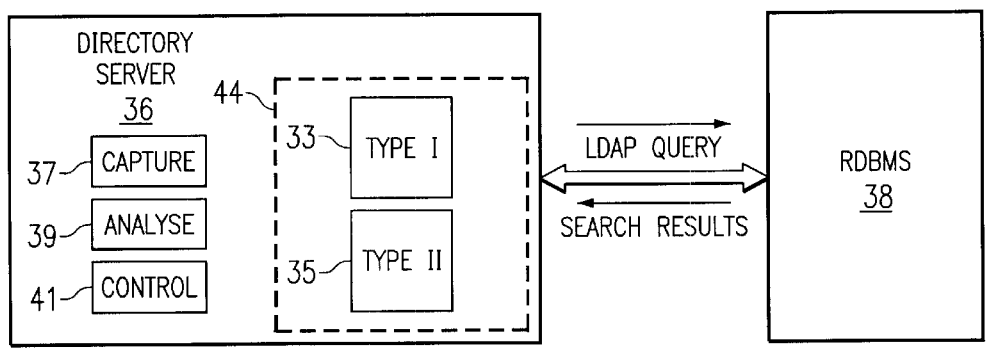
FIG. 5 is a simplified block diagram of the directory service caching mechanism of the present invention.

With the above as background, FIG. 5 illustrates a block diagram of an inventive caching mechanism that is preferably implemented at or in association with the LDAP directory service. The directory service includes an LDAP server 36 and a relational database backing store 38 as previously described. LDAP server 36 is typically a computer having suitable memory partitioned into a first cache 33 and a second cache 35. The first cache 33 is sometimes referred to herein as a Type I cache, and the second cache 35 is sometimes referred to herein as a Type II cache. First and second caches 33 and 35 may comprise part of the same local storage area, or each cache may be associated with its own local storage area. As used herein, the designations "first" and "second" thus may not designate different physical structures. In a preferred embodiment, the Type I and Type II caches are merely separate memory locations of the same random access memory (RAM) of the LDAP server, although any suitable storage area(s) may be used for this purpose.

The inventive caching mechanism further includes a data capture routine 37, a data analysis routine 39, and a control routine 41. As will be seen, data capture routine 37 is used to capture information about a user's data access history. Preferably, the data capture routine is executed against a specific application, although this is not required. This is sometimes referred to herein as profiling the application. The information collected by the data capture routine is supplied to the data analysis routine 39 to identify the user's access history. This is sometimes referred to herein as a repetitive user query pattern. In response, the data analysis routine 39 uses such information to calculate when entries should be pre-fetched and stored in the cache and the identity of such entries. Thus, for example, the data analysis routine 39 generates several outputs: a recommended pre-fetching time (when given data should be pre-fetched), a filter key for the pre-fetch, and a cache replacement policy (i.e., when the cache should be flushed). Thus, for example, the cache replacement policy may replace the least recently used (LRU) cached entries upon expiration of the cache lifetime. Alternatively, the cache replacement policy may be static, which indicates that the data in the cache is not removed until the cache lifetime expires. Other cache replacement policies may be used as well. Based on the information generated by the data analysis routine 39, the control routine 41 manages the pre-fetching and caching of user information. These routines will now be described in detail below.

Preferably, the user's data access history is stored in the Type I cache. The entries actually retrieved from the backing store as a result of the user's queries preferably are stored in the Type II cache. By implementing the Type I and Type II caches in the directory service local storage area, repetitive search queries are handled without resort to the relational database 38 as will be seen. This caching mechanism provides significant performance improvements as will be seen. According to the invention, a unit of the Type I cache is a set of identifiers (IDs) that qualify for a given LDAP search query of a particular filter key. The unit is indexed by that filter key. A unit of Type II cache is an entry qualified for the search and is indexed by its identifier.

Figure 6:
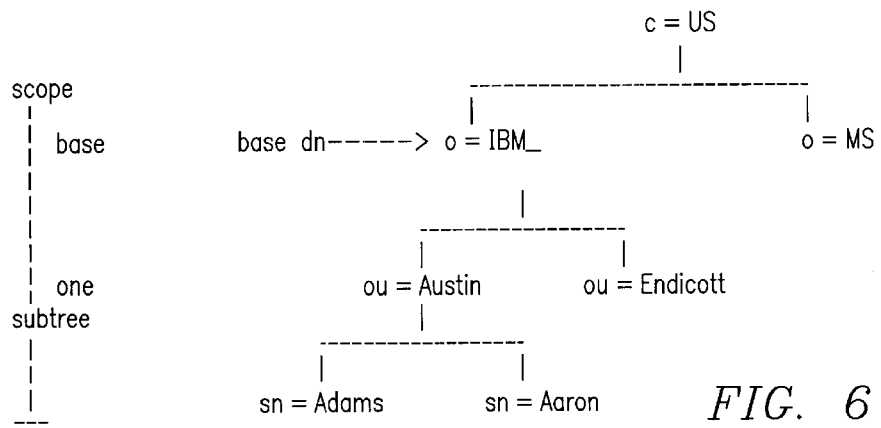
FIG. 6 is a representative LDAP directory tree.

By way of brief background, and with reference to the representative directory tree in FIG. 6, a typical LDAP search may be as follows:

ldapsearch -b "c=IBM_US, c=US" -s sub (sn=smith); where: "-b" is the base distinguished name (DN) from which the search is initiated, "-s" is the scope of the search (either base, one or subtree), and "sn=smith" is the filter string that specifies the condition the search needs to find matches in the directory. The three elements above form a unique combination of criteria for a given LDAP search query. As is well known, a filter key is a combination of filter string+scope+base DN, and each filter key is thus unique for an LDAP search. In the above example, the filter key is:

"(sn=smith)2o=IBM_US,c=US", where 2 is a numeric representation of the scope subtree level (with base level being 0 and one level being 1).

Figure 7:
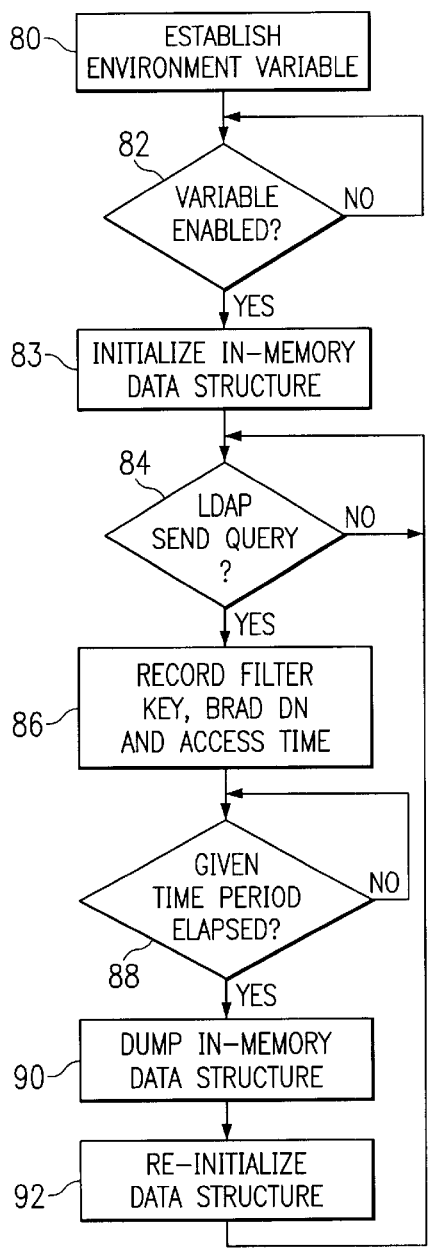
FIG. 7 is a flowchart of a data capture routine of the present invention.

FIG. 7 is a representative flowchart of the data capture routine 37 that is used to capture the queries that users exercise against the LDAP server. The routine begins at step 80 to establish an environment variable (DataCapture) to enable and disable the data capturing. At step 82, a test is run to determine whether the environment variable is enabled. This variable may be enabled by a system administrator or a user. At step 83, an in-memory data structure in the Type I cache is initialized. At step 84, the routine tests to determine whether an LDAP search request has occurred. If not, the routine cycles. If an LDAP search request has occurred, the routine continues in step 86 to record the following information, preferably in an in-memory hash table (in the Type I cache): the filter key (base DN, search scope, filter string), the bind DN of the person who issued the search request, and the access time (i.e. the time that the query is issued). The filter key is the key to the hash table, and the access time is preferably recorded in a linked list for a specific filter key, although any suitable data structure may be used for this purpose. At step 88, a test is made to determine whether a given time period has elapsed. This time period may be a given day, a given week, or some other reference period over which the user' access history is being captured. Preferably, the time period is set to daily.

If the outcome of the test at step 88 is negative, the routine cycles. If the outcome of the test at step 88 is positive, the routine continues at step 90 to dump the in-memory data structure. This represents the end of the cache lifetime. At step 92, the in-memory data structure is reinitialized. Control then returns back to step 84.

The information collected by the data capture routine and stored in the Type I cache is supplied to the data analysis routine 39. The routine uses the information to try to identify a user access pattern. In a preferred embodiment, the user access pattern typically includes a daily peak access (if they exist), which are time periods in a day in which the user makes the same query. For example, the user may logon (e.g., request the same userid and password from the directory server) in the morning between 8:00 am and 9:00 am, and then logon again in the afternoon between 1:00 pm and 2:00 pm. Each one of these periods thus reflects a daily peak access time. The user's daily access pattern may also identify other, general queries that are performed daily. Typically, the times at which the queries are performed over a given day are uniformly distributed within the work hours.

In such case as will be seen, the caching mechanism preferably populates the (Type II) cache before the user's normal work hours begin. Further, filter keys with this usage pattern preferably are not removed from the cache until the user's normal working hours end. Of course, while the above-described caching is preferred, the actual caching implementation will depend on the data capture and its subsequent analysis.

Of course, the types of user access query patterns varies with the particular application. Consider the SSO application. For example, user A usually logs on to his system every weekday between 8:00 to 8:30 AM. User B, however, usually logs on to his system around noon. The logon request invokes LDAP search APIs to obtain the password from the LDAP servers. In this example, the pre-fetch algorithm will prefetch the user entries that contain the password information for user A before 8:00 AM and for user B before noon. When user A or B logs on, all the information is stored in the cache, and no disk I/O is required to obtain the information.

Figure 8:
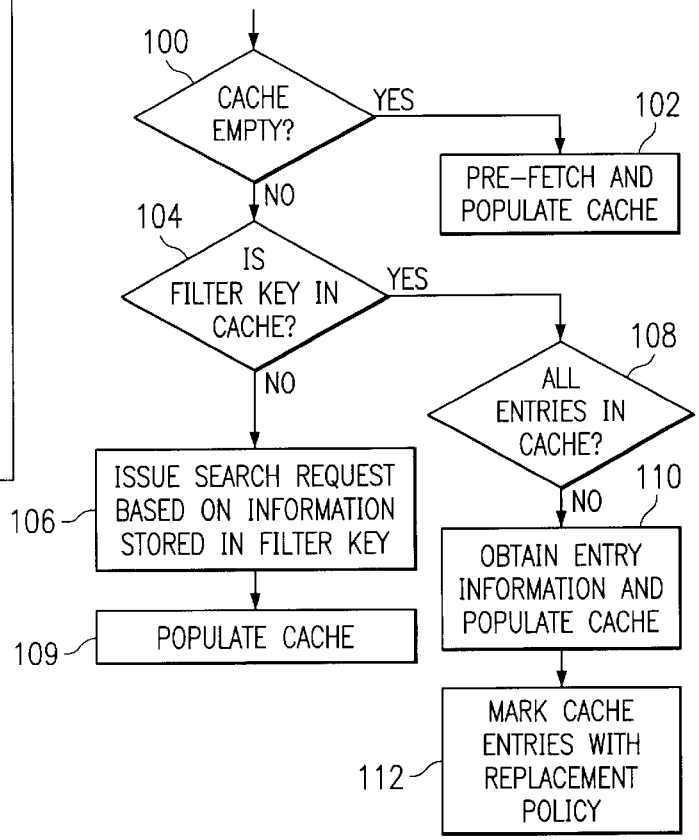
FIG. 8 is a flowchart of a preferred caching routine of the present invention.

Generalizing, based on the information generated from the data analysis routine 39, the control routine 41 then performs the method illustrated in the flowchart of FIG. 8. At step 100, a test is performed to determine whether the cache is empty. If so, the routine pre-fetches the data and populates the cache based on the recommended pre-fetching time. This is step 102. If the cache is not-empty, the routine checks at step 104 to determine whether the filter key is in the filter cache. If the outcome of the test at step 104 is negative, the routine continues at step 106 to issue a search request based on the information stored in the filter key. The information is then used to populate the cache in step 109. If the outcome of the test at step 104 is positive, the filter key is in the cache. Then, controls continues at step 108 to test whether all the entries are in the entry cache (the Type II cache). If the outcome of the test at step 108 is negative, e.g., because some of the entries are not in the Type II cache, the routine continues at step 110 to obtain the entry information from the directory server to populate the cache. At step 112, while populating the cache, the routine marks the cache entries (filter key and entries) with an appropriate cache replacement policy. Thus, for example, the cache replacement policy is LRU or static. For cache entries marked as static, the data is not removed from the cache until the cache lifetime expires. For LRU, the least recently used entries are removed. This completes the processing.

In the preferred embodiment, the cache may be shared by all the applications. To manage multiple applications, the control routines need to know who (the dn) is accessing what (the filter), and store the results in cache. Different users may use different applications (with different filters) to access directory information. A mutex is used to synchronize the cache update to make sure the pointers do not get corrupted. Typically, the Type I cache preferably is indexed by EID. Multiple users preferably share entry information stored in the Type II cache.

As will be seen, the inventive caching scheme preferably takes advantage of several LDAP table structures that are now described below. Further details about these structures are provided in U.S. Ser. No. 09/050,503, titled "A Fast and Efficient Method to Support Hierarchical LDAP Searches With Relational Tables", now U.S. Pat. No. 6,085,188, issued Jul. 4, 2000, assigned to the assignee of this application, and incorporated herein by reference.

Entry table:
   This table holds the information about a LDAP entry. This table is used for obtaining the EID of the entry and supporting LDAP_SCOPE_ONELEVEL and LDAP_SCOPE_BASE search scope.
   EID. The unique identifier of the LDAP entry. This field is indexed.
   PEID. The unique identifier of a parent LDAP entry in the naming hierarchy.
   EntryData. Entries are stored using a simple text format of the form attribute: value. Non-ASCII values or values that are too long to fit on a reasonable sized line preferably are represented using a base 64 encoding. Giving an ID, the corresponding entry can be returned with a single SELECT statement.
Descendant Table:
   The purpose of this table is to support the subtree search feature of LDAP. For each LDAP entry with an unique ID (AEID), this table contains the descendant entries unique identifiers (DEID). The columns in this table are:
   AEID. The unique identifier of the ancestor LDAP entry. This entry is indexed.
   DEID. The unique identifier of the descend LDAP entry. This entry is indexed.
Attribute Table:
   One table per searchable attribute. Each LDAP entry is assigned an unique identifier (EID) by the backing store. The columns for this table are:
   EID
   Attribute Value
   Thus, in the parent table, the EID field is the unique identifier of an entry in the LDAP naming hierarchy. The PEID field is the unique identifier of the parent entry in the naming hierarchy. In the descendant table, the AEID field is the unique identifier of a ancestor LDAP entry in the LDAP naming hierarchy. The DEID field is the unique identifier of the descend LDAP entry.

In addition to the table structures described above, the following SQL SELECT statements are used by LDAP search routines:

---

Base Level Search:
```
    SELECT entry.EntryData,
        from ldap_entry as entry
        where entry.EID in (
            select distinct ldap_entry.EID
            from -table list-
            where (ldap_entry.EID=-root dn id- )
                -sql where expressions-)
```
One Level Search:
```
    SELECT entry.EntryData,
        from ldap_entry as entry
        where distinct ldap_entry.EID
        from ldap_entry, -table list-
            ldap_entry as pchild, -list of tables-
            where ldap_entry.EID=pchild.EID
            AND pchild.PIED=-root dn id-
                -sql where expressions-)
```
Subtree Search
```
    SELECT entry.EntryData,
        from ldap_entry as entry
        where entry.EID in (
            select distinct ldap_entry.EID
            from ldap_entry, ldap_desc, -table list-
            where
            (LDAP_ENTRY.EID=ldap_desc.DEID AND
                ldap_desc.AEID=-root dn id-)
            ldap_entry as pchild. -table list-
```

```
     where ldap_entry.EID=ldap_desc.EID
     AND ldap_desc.AEID=% d -where
expressions-).
```

In the above representation, -table list- and -where expression- are the two null terminated strings returned by the SQL generator. The -root dn id- is the unique identifier of the root DN. The where clause should only be generated if -where expression- is not the empty string and no errors where detected in the parsing the LDAP filter.

As is well-known, LDAP search queries comprise six basic filters with the format -attribute- -operator- -value-. Complex search filters are generated by combining basic filters with Boolean operators AND (&), OR (|) and NOT (!). For each LDAP filter element or sub-expression, there is a set of entries (EIDs) that will satisfy the element. Thus, each element generally maps to a set of EIDs.

As noted above, the invention may be implemented in any directory service in which a relational database management system (RDBMS) is used to provide a backing store function. Typically, an SQL query is generated and used to access the relational database, and results are then returned in response to this query. As described above, search results are cached over a given data capture period, with the information then being used by a data analysis routine to generate a data access history for the user. That history is then used to generate a recommended pre-fetch, the filter key for the pre-fetch, and a preferred cache replacement policy (e.g., static or LRU). Based on that information, the control routine pre-fetches and populates the cache with information that is expected to be needed by the user as a result of that access history. The resulting cache mechanism is robust and ensures that repetitive search queries are managed through the cache as opposed to through repeated, yet unnecessary search queries from the directory service to the relational database.

Applications that exhibit a pattern within their queries recognize a performance benefit the first time data is accessed. Indeed, as noted above, there are a large number of applications that only make queries once or infrequently. However, these queries are made on a regular basis. The data capture and analysis tools of the invention seek to identify daily, weekly or other periodic access patterns that are then useful in determining what information should be pre-fetched and cached. Preferably, the inventive routine identifies the pattern by which the user accesses information randomly within a day. Typically, the times that the queries are performed in a day are uniformly distributed within the work hours. In this case, the inventive cache system populates the cache before the user's normal work hours start. Instead of using the LRU method to flush the cache, filter keys with this usage pattern are not removed from the cache until the user's normal working hours end.

One of ordinary skill will appreciate that the invention can be applied to any relational database management system (RDBMS). In addition, the EID sets approach can also be applied to b-tree based LDAP server implementation. The inventive algorithm may be applied to any LDAP server implementation, including Netscape Directory Server.

One of the preferred embodiments of the routines of this invention is as a set of instructions (computer program code) in a code module resident in or downloadable to the random access memory of a computer. Until required by the computer, the set of instructions may be stored in another computer memory, for example, in a hard disk drive, or in a removable memory such as an optical disk (for eventual use in a CD ROM) or floppy disk (for eventual use in a floppy disk drive), or downloaded via the Internet or other computer network. In addition, although the various methods described are conveniently implemented in a general purpose computer selectively activated or reconfigured by software, one of ordinary skill in the art would also recognize that such methods may be carried out in hardware, in firmware, or in more specialized apparatus constructed to perform the required method steps.

Having thus described our invention, what we claim as new and desire to secure by letters patent is set forth in the following claims.

What is claimed is:

1. A method of populating a directory server cache, comprising the steps of:
   profiling an application for any repetitive user query patterns;
   based on the existence of a repetitive user query pattern, identifying data that are likely to satisfy a directory query expected to occur at an anticipated time; and
   populating the cache with the identified data prior to the anticipated time.

2. The method as described in claim 1 wherein the populating step includes pre-fetching the identified data from a backing store associated with the directory server.

3. The method as described in claim 1 wherein the directory query is a Lightweight Directory Access Protocol (LDAP) query.

4. The method as described in claim 1 further including the step of implementing a cache replacement policy based on the repetitive user query pattern.

5. The method as described in claim 4 wherein the cache replacement policy maintains the identified data in the cache until a cache lifetime expires.

6. The method as described in claim 4 wherein the cache replacement policy flushes least recently used entries from the cache.

7. The method as described in claim 1 wherein the repetitive user query pattern is captured over a given period.

8. The method as described in claim 1 wherein information comprising the repetitive user query pattern is stored in a first portion of the cache and the identified data is stored in a second portion of the cache.

9. A method for caching search result retrieved from a backing store in response to a Lightweight Directory Access Protocol (LDAP) directory service generating filter-based queries, comprising the steps of:
   capturing information in response to LDAP search queries to the backing store applied against a given application;
   analyzing the captured information to identify a repetitive user query pattern;
   based on the existence of a repetitive user query pattern, identifying data that are likely to satisfy a directory query expected to occur at an anticipated time; populating a cache with the identified data prior to the anticipated time; and
   responsive to a new LDAP search query, retrieving the identified data from the cache in lieu of the backing store.

10. The method as described in claim 9 wherein the populating step includes pre-fetching the identified data from the backing store.

11. The method as described in claim 9 further including the step of implementing a cache replacement policy based on the repetitive user query pattern.

12. The method as described in claim 11 wherein the cache replacement policy maintains the identified data in the cache until a cache lifetime expires.

13. The method as described in claim 9 wherein the repetitive user query pattern is captured over a given period.

14. The method as described in claim 9 wherein information comprising the repetitive user query pattern is stored in a first portion of the cache and the identified data is stored in a second portion of the cache.

15. A method of populating a cache, comprising the steps of:

capturing information in response to search queries to a database applied against a given application;

analyzing the captured information to identify a repetitive user query pattern;

based on the existence of a repetitive user query pattern, identifying data that are likely to satisfy a directory query expected to occur at an anticipated time;pre-fetching the identified data from the backing store prior to the anticipated time;

populating the cache with the pre-fetched identified data; and responsive to a new search query, retrieving the identified data from the cache in lieu of the backing store.

16. The method as described in claim 15 further including the step of identifying a cache replacement policy based on the repetitive user query pattern.

17. A computer program product in computer-readable medium for populating a directory server cache, comprising:

means for profiling an application to identify any repetitive user query patterns;

means responsive to the profiling means identifying a repetitive user query pattern for identifying data that are likely to satisfy a directory query expected to occur at an anticipated time; and means for populating the cache with the identified data prior to the anticipated time.

18. The computer program product as described in claim 17 wherein the populating means includes means for pre-fetching the identified data from a backing store associated with the directory server.

19. The computer program product as described in claim 17 further including the means for implementing a cache replacement policy based on the repetitive user query pattern.

20. A directory service, comprising:

a directory organized as a naming hierarchy having a plurality of entries each represented by a unique identifier;

a relational database management system having a backing store for storing directory data;

a directory server cache;

a caching mechanism for populating the directory server cache, comprising:

means for profiling an application to identify any repetitive user query patterns;

means responsive to the profiling means identifying a repetitive user query pattern for identifying data that are likely to satisfy a directory query expected to occur at an anticipated time; and means for populating the cache with the identified data prior to the anticipated time.

21. The directory service as described in claim 20 wherein the populating means includes means for pre-fetching the identified data from a backing store associated with the directory server.

22. The directory service as described in claim 20 further including the means for implementing a cache replacement policy based on the repetitive user query pattern.

23. The directory service as described in claim 20 wherein the directory is compliant with the Lightweight Directory Access Protocol (LDAP).

24. A caching system for use with a directory server having a backing store, comprising:

a cache;

a data capture module for capturing information over a given time period about a user's search queries exercised against a given application;

a data analysis module for processing the information to identify a user access pattern and generating cache control information; and a control module for using the control information to populate the cache.

25. The caching system as described in claim 24 wherein the control information includes a pre-fetch time, a filter key, and a cache replacement policy.

* * * * *